US012598248B2

(12) United States Patent
Wade et al.

(10) Patent No.: US 12,598,248 B2
(45) Date of Patent: Apr. 7, 2026

(54) PERSONALIZED REAL-TIME MESSAGING

(71) Applicant: DISH Network L.L.C., Englewood, CO (US)

(72) Inventors: Joshua D. Wade, Castle Rock, CO (US); Jason Anthony Madruga, Castle Rock, CO (US); Ryan Scribner, Erie, CO (US)

(73) Assignee: DISH Network L.L.C., Englewood, CO (US)

( * ) Notice: Subject to any disclaimer, the term of this patent is extended or adjusted under 35 U.S.C. 154(b) by 295 days.

(21) Appl. No.: 18/545,174

(22) Filed: Dec. 19, 2023

(65) Prior Publication Data

US 2025/0203003 A1 Jun. 19, 2025

(51) Int. Cl.
| | |
|---|---|
| *H04M 1/72412* | (2021.01) |
| *H04M 1/72436* | (2021.01) |
| *H04M 1/72457* | (2021.01) |
| *H04W 12/02* | (2009.01) |

(52) U.S. Cl.
CPC ... *H04M 1/72412* (2021.01); *H04M 1/72436* (2021.01); *H04M 1/72457* (2021.01); *H04W 12/02* (2013.01)

(58) Field of Classification Search
CPC ......... H04M 1/72412; H04M 1/72436; H04M 1/72457; H04W 12/02

USPC ...................................................... 455/456.3
See application file for complete search history.

(56) References Cited

U.S. PATENT DOCUMENTS

| | | | |
|---|---|---|---|
| 9,953,367 B2 * | 4/2018 | Del Vecchio | H04L 67/52 |
| 2010/0257234 A1 * | 10/2010 | Caughey | H04L 67/306 709/227 |
| 2016/0307289 A1 * | 10/2016 | Choksi | G06Q 10/06311 |
| 2021/0090156 A1 * | 3/2021 | Deveaux | G06F 16/955 |

* cited by examiner

*Primary Examiner* — Don N Vo
(74) *Attorney, Agent, or Firm* — Kilpatrick Townsend & Stockton LLP

(57) ABSTRACT

Devices, systems, and methods for messaging a user of a multi-unit property are provided. An example method includes identifying a current location of a user located within a multi-unit property, identifying a user characteristic of the user, determining a point of interest (POI) for the user, based on the identified user characteristic and the current location of the user, identifying at least one first display device in proximity to the user, determining a first privacy level of the first display device, generating at least one first message related to the determined POI, and the at least one first message has a first message sensitivity level corresponding to the first privacy level. The method further includes transmitting the at least one first message to the first display device and causing the first display device to display the first message for the user to view.

20 Claims, 9 Drawing Sheets

200B

Content Management Platform 108

Communications Network 105

Positioning Engine 112

Multi-Unit Property Environment 102

AP 123

Broadcast Device 210

UE 110

User

Message 202

125

201

500

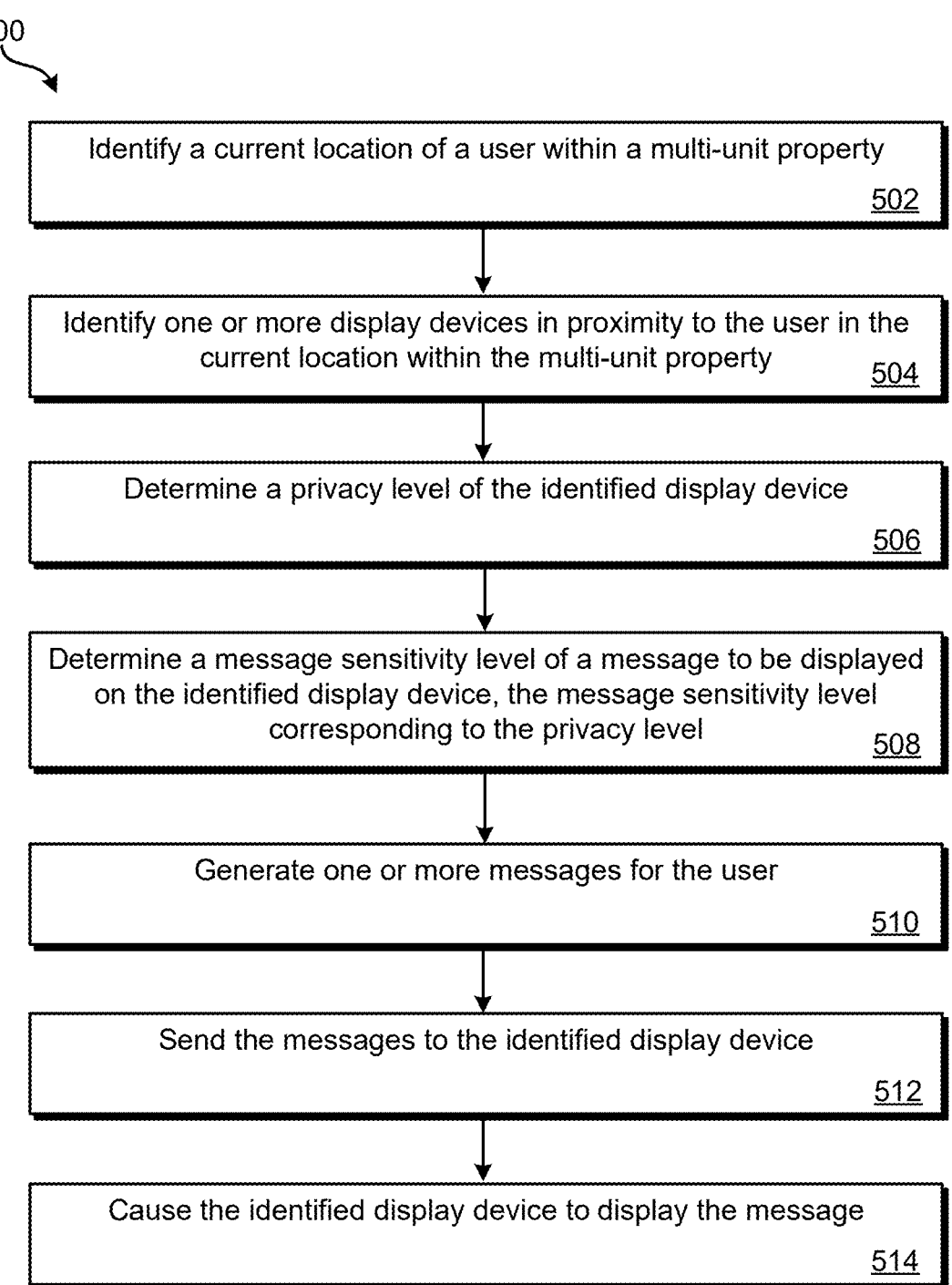

Identify a current location of a user within a multi-unit property

502

Identify one or more display devices in proximity to the user in the current location within the multi-unit property          504

Determine a privacy level of the identified display device

506

Determine a message sensitivity level of a message to be displayed on the identified display device, the message sensitivity level corresponding to the privacy level          508

Generate one or more messages for the user

510

Send the messages to the identified display device

512

Cause the identified display device to display the message

PERSONALIZED REAL-TIME MESSAGING

BACKGROUND OF THE DISCLOSURE

Timely and effective communication to tenants within a multi-unit property are of paramount importance in today's dynamic living environments. In multi-unit properties, tenants often have diverse interests and purposes for their residency, making it important to provide specific and personalized notifications to meet their individual needs. However, current approaches used in multi-unit properties often involve traditional messaging approaches such as physical notices, bulletin boards, and email communication. These one-size-fits-all messaging approaches usually provide generic and non-specific messages for all tenants and lack personalization. The information contained in these non-specific messages may not be relevant to every tenant and can lead to disengagement and the potential oversight of important details. Furthermore, these traditional messaging approaches are not well-suited for real-time communication, and tenants may not receive timely information.

Additionally, communication using traditional messaging approaches in a multi-unit property often relies on pushing notifications to users' personal devices such as smartphones. While this can provide the advantage of reaching users directly through their personal devices, it has some limitations. Personal device notifications often lack contextual awareness and lacks consideration of the user's current location, activity, or surroundings, which may lead to irrelevant messages as well as a flood of notifications. Additionally, these approaches may not adequately cater to communal or group-oriented messaging needs, where information should be readily accessible to multiple users of a user group.

BRIEF SUMMARY OF THE DISCLOSURE

In accordance with some embodiments of the present disclosure, a method is provided. In one example, a method includes: identifying a current location of a user located within a multi-unit property, identifying a user characteristic of the user, based on a user profile associated with the user, determining a point of interest (POI) for the user, based on the identified user characteristic and the current location of the user, identifying at least one first display device in proximity to the user, based on the current location of the user within the multi-unit property, determining a first privacy level of the first display device, generating at least one first message related to the determined POI, the at least one first message having a first message sensitivity level corresponding to the first privacy level, transmitting the at least one first message to the first display device, and causing the first display device to display the first message for the user to view.

In some embodiments, the method further includes determining a second privacy level of the at least one second display device, generating at least one second message related to the first message, the at least one second message having a second message sensitivity level corresponding to the second privacy level, transmitting the at least one second message to the second display device, and causing the second display device to display the second message for the user to view. In some embodiments, the second message sensitivity level is lower than the first message sensitivity level. In some embodiments, the first message is displayed on the first display device at a first time, and the second message is displayed on the second display device at a second time later than the first time.

In accordance with some embodiments of the present disclosure, messaging systems are provided. In one example, a system includes: a positioning engine, a property management system (PMS), a content management platform (CMP), and one or more display devices within the multi-unit property. The positioning engine is configured to identify a current location of a user located within the multi-unit property and identify at least one first display device in proximity to the user, based on the current location of the user within the multi-unit property. The PMS is configured to generate a user profile of the user, identify a user characteristic of the user, based on the user profile, and determine a point of interest (POI) for the user, based on the identified user characteristic and the location of the user. The CMP is configured to determine a first privacy level of the first display device, generate at least one first message related to the determined POI, the at least one first message having a first message sensitivity level corresponding to the first privacy level, transmit the at least one first message to the first display device, and cause the first display device to display the first message for the user to view.

In accordance with some embodiments of the present disclosure, systems for messaging a user of a multi-unit property are provided. In one example, a system includes one or more processors and a computer-readable storage media storing computer-executable instructions. The computer-executable instructions, when executed by the one or more processors, cause the system to: identify a current location of a user located within a multi-unit property, identify a user characteristic of the user, based on a user profile associated with the user, determine a point of interest (POI) for the user, based on the identified user characteristic and the current location of the user, identify at least one first display device in proximity to the user, based on the current location of the user within the multi-unit property, determine a first privacy level of the first display device, generate at least one first message related to the determined POI, the at least one first message having a first message sensitivity level corresponding to the first privacy level, transmit the at least one first message to the first display device, and cause the first display device to display the first message for the user to view.

In accordance with some embodiments, the present disclosure also provides a software product. The software product is in the form of a non-transitory machine-readable storage medium encoded with instructions, and the instructions are executable to cause one or more electronic processors of a system to perform any methods or operations thereof described herein.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

3

Figure 2A:
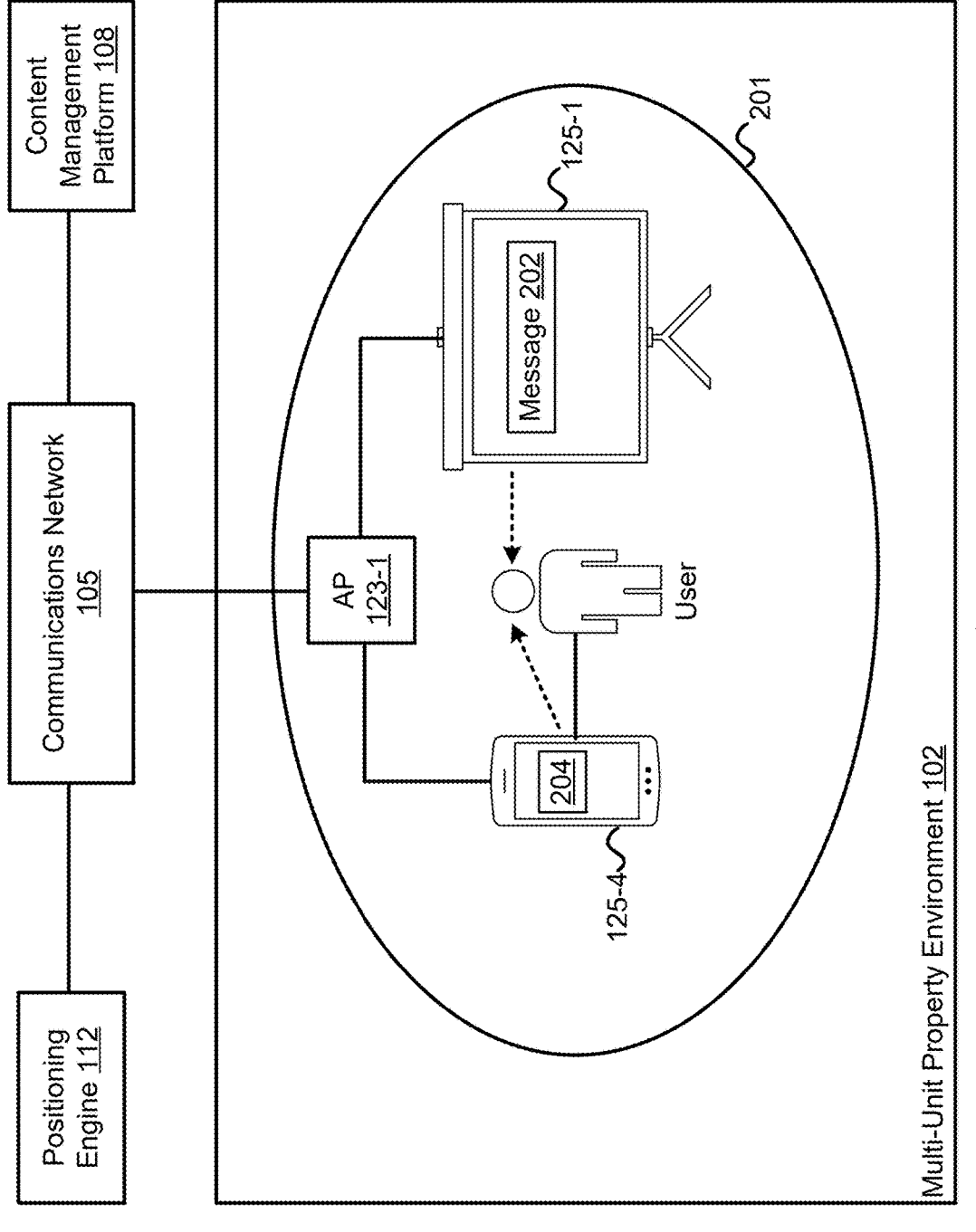

FIG. 2A is a block diagram illustrating an example of a messaging system according to various embodiments.

Figure 2B:
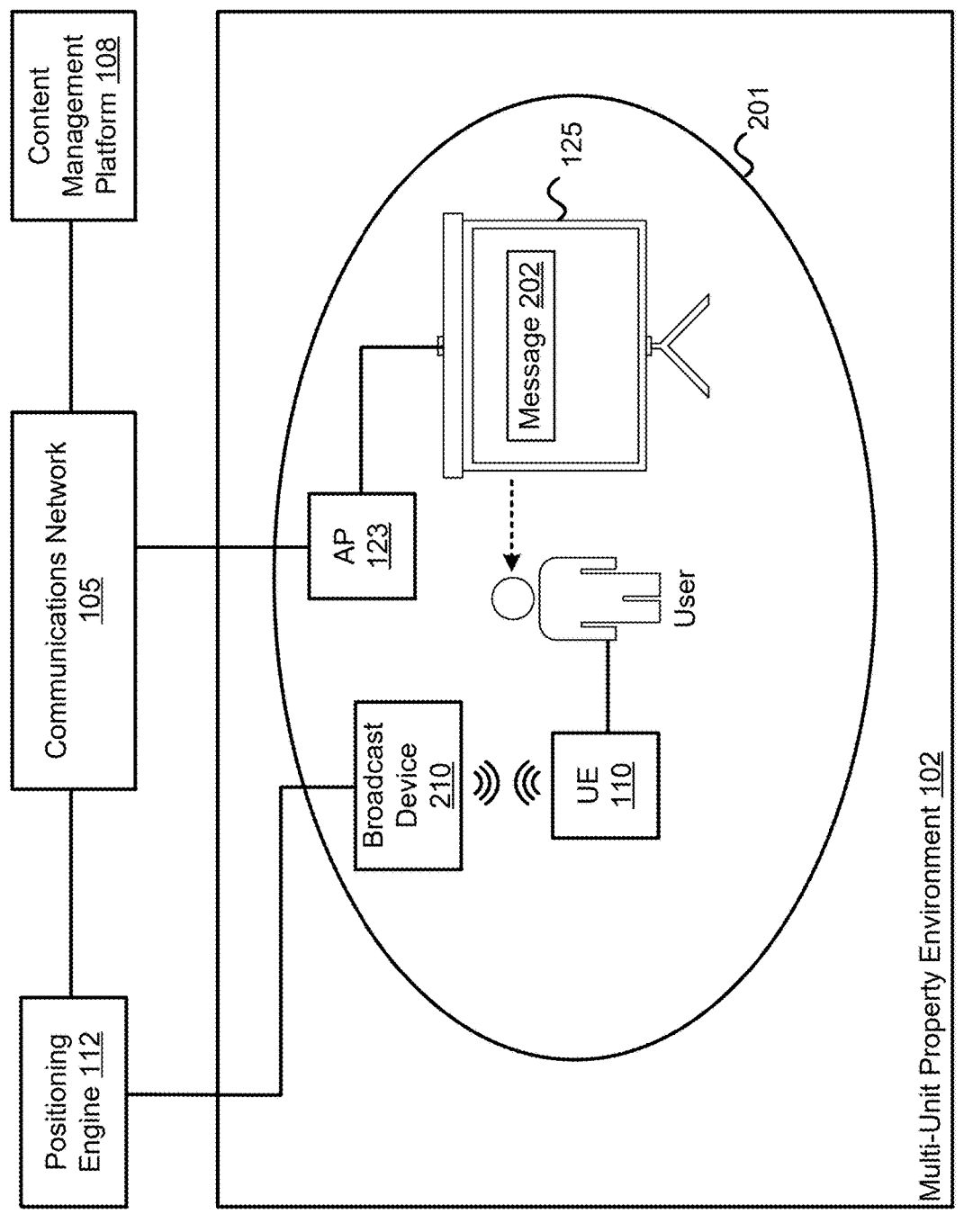

FIG. 2B is a block diagram illustrating another example of a messaging system according to various embodiments.

Figure 3:
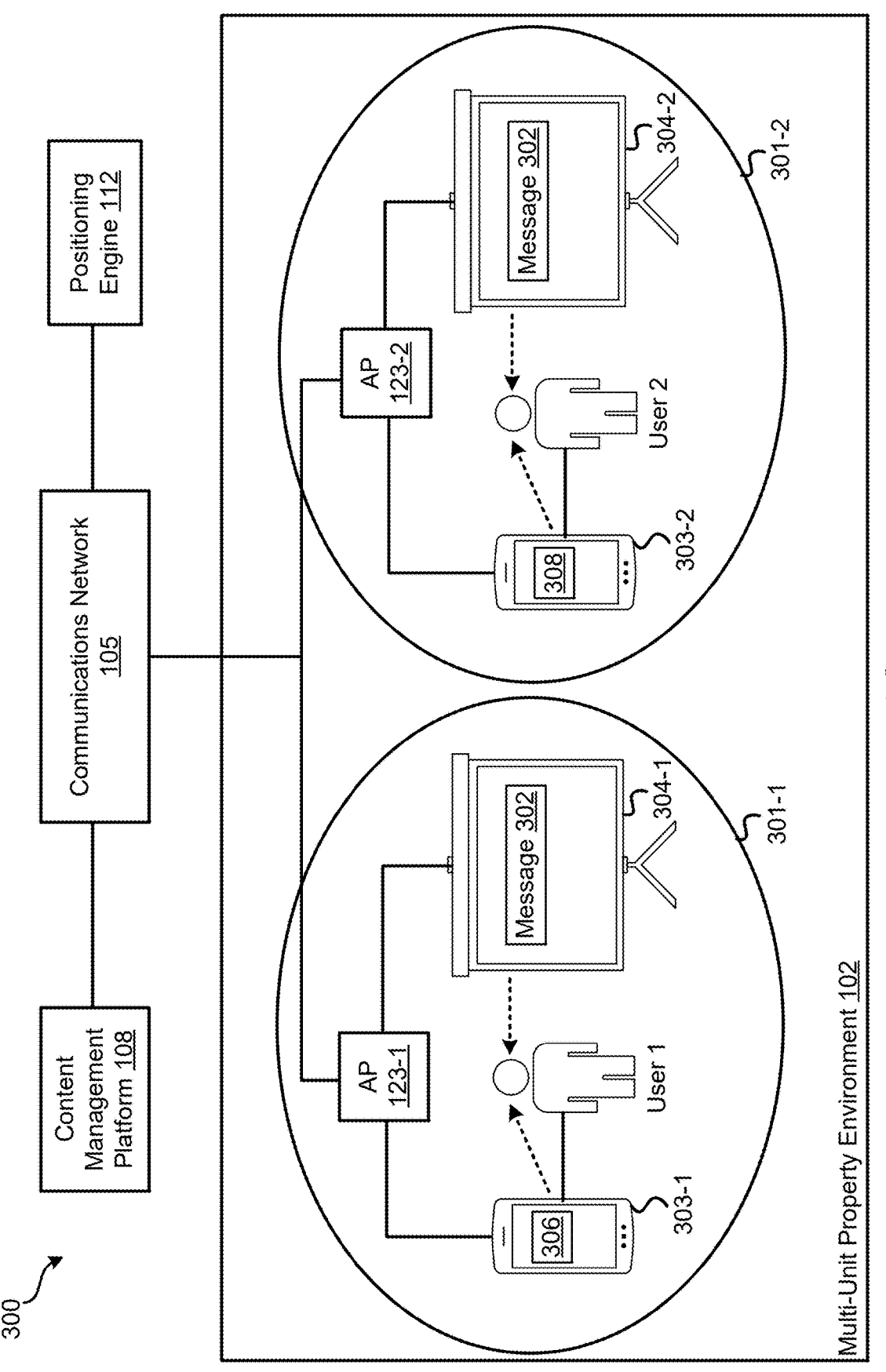

FIG. 3 is a block diagram illustrating another example of a messaging system according to various embodiments.

Figure 4A:
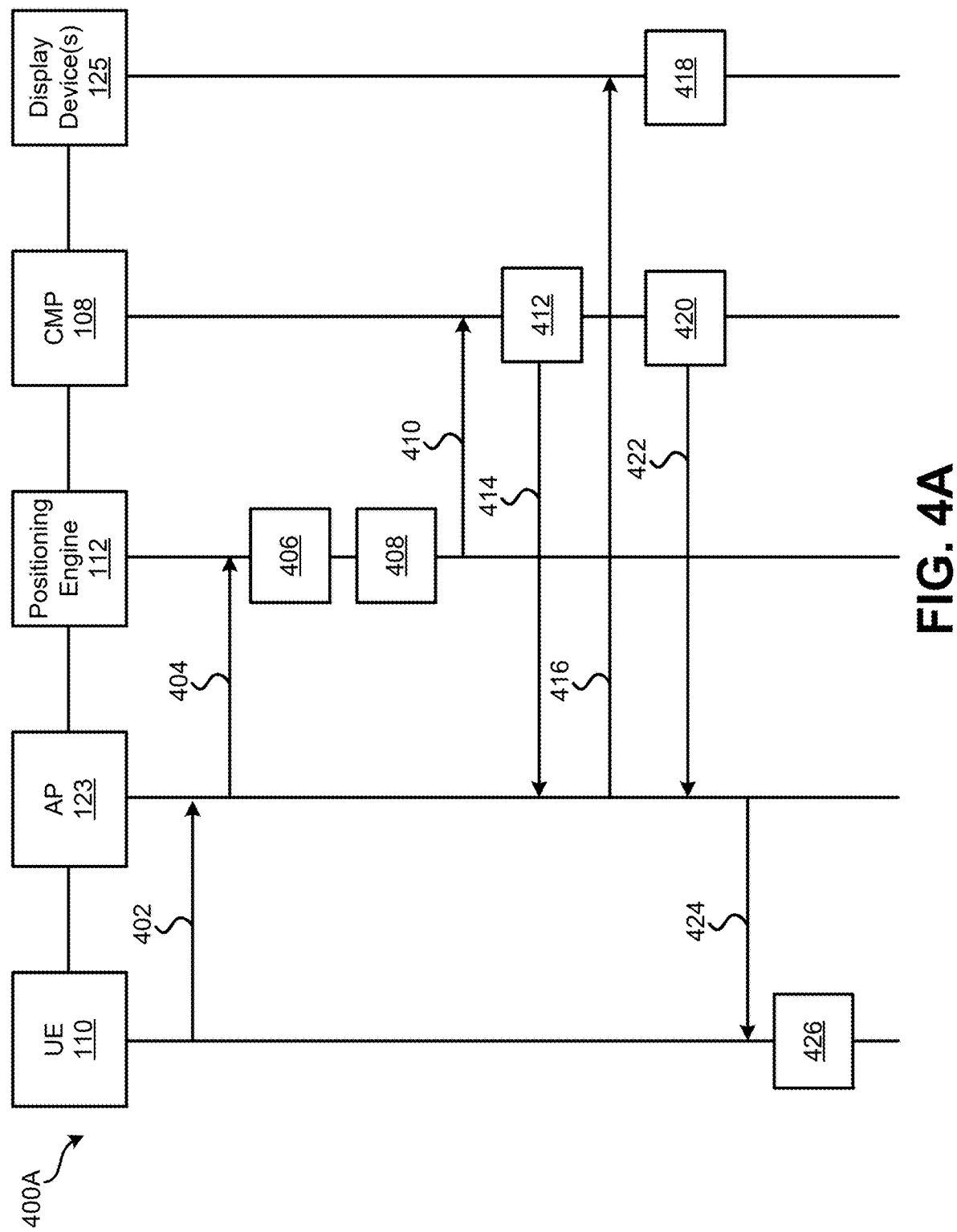

FIG. 4A is a message flow diagram illustrating an exemplary process for messaging a user of a multi-unit property according to various embodiments.

Figure 4B:
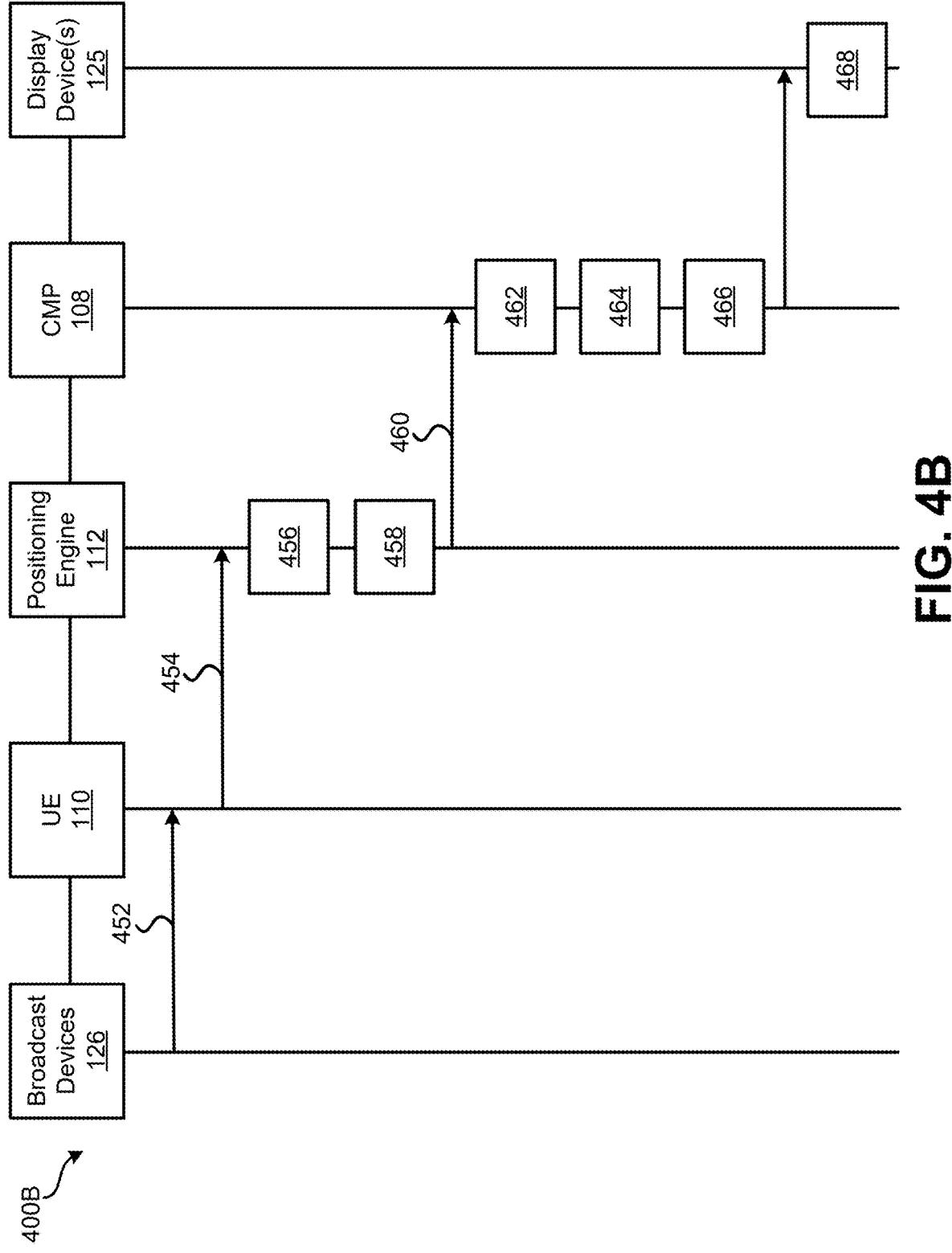

FIG. 4B is a message flow diagram illustrating another exemplary process for messaging a user of a multi-unit property according to various embodiments.

FIG. 5 is a flow diagram illustrating an example method for messaging a user of a multi-unit property according to various embodiments.

Figure 6:
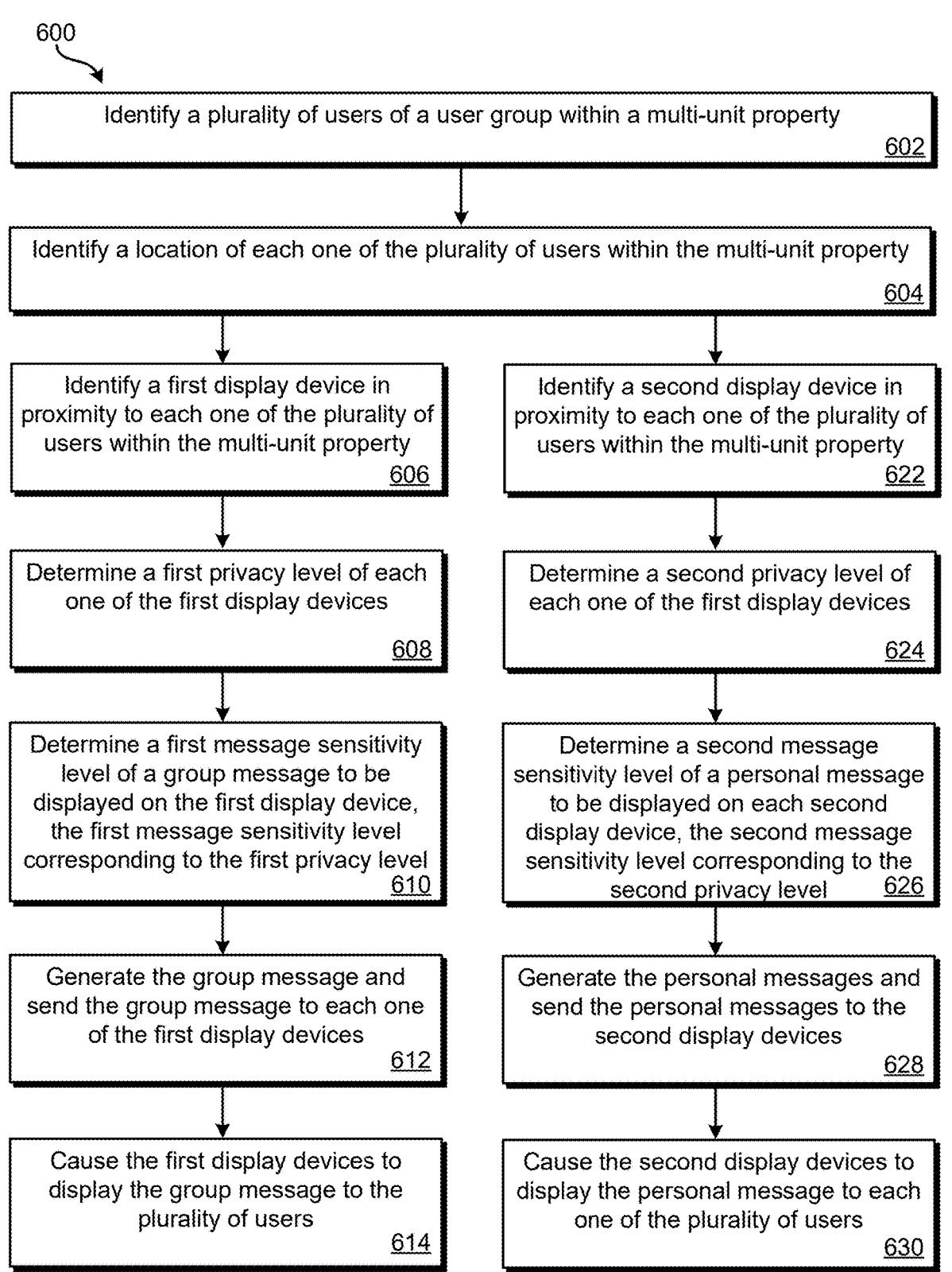

FIG. 6 is a flow diagram illustrating another example method for messaging a user of a multi-unit property according to various embodiments.

Figure 7:
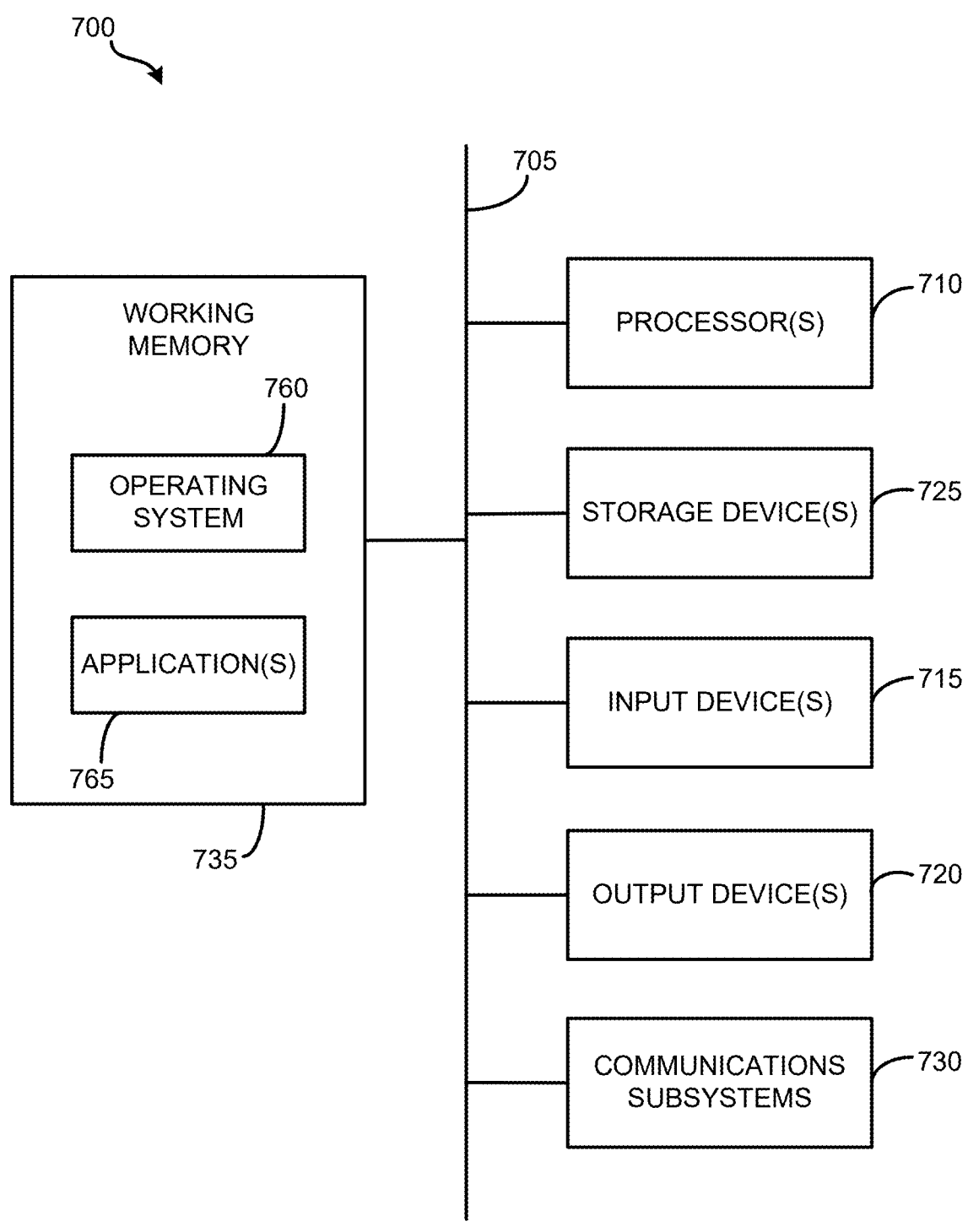

FIG. 7 is a block diagram illustrating an embodiment of a computer system according to various embodiments.

DETAILED DESCRIPTION OF THE DISCLOSURE

The present disclosure provides messaging systems and methods to address the above-stated challenges. One insight provided in the present disclosure is related to a content management platform (CMP) for customization and personalization of message contents for users (e.g., tenants, residents, occupants, guests, etc.) of a multi-unit property. The CMP may identify a user characteristic from a user profile associated with the user and specific to the multi-unit property. The CMP may further identify a point of interest (POI) or a specific need of the user, based on the user characteristic and a current location of the user within the multi-unit property. The CMP may generate a user-specific content in the message that aligns with the specific interests or needs of the user and push the message to a display device in proximity to the user. Using the location-based messaging, the present approach represents can enhance user engagement and interaction by delivering not just personalized, but contextually relevant content, within the multi-unit property environment.

Another insight provided by the present disclosure is related to a messaging approach rooted in hierarchy for displaying multiple messages respectively on multiple display screens within the multi-unit property, each tailored for individual users to view. The hierarchy may encompass a range of message types and/or message sensitivity levels. For example, the present approach enables the delivery of a user-specific message having a high message sensitivity level on a large public display screen that has a relatively low privacy level. Simultaneously or sequentially, the present approach also allows the display of a more personalized and individualized message having a low message sensitivity level, finely tuned to individual users' preferences and requirements, on a display device that has a relatively high privacy level, such as a private display specific to the user, a semi-public display device temporarily dedicated to the user, and/or the user's personal devices. The displays in the multi-unit property such as the public display, semi-public display, as well as private display dedicated to the users are typically larger and more prominently positioned, making messages easily visible to the user. Users may notice and read messages on these large displays, thereby increasing the likelihood of message reception. For example, some public displays are placed in high-traffic areas, which can be particularly valuable for conveying time-sensitive or critical messages. Public displays can also provide context-relevant information in the message for the user to quickly become aware of events, updates, promotions, or other important notices that pertain to their current location and/or POI.

Figure 1:
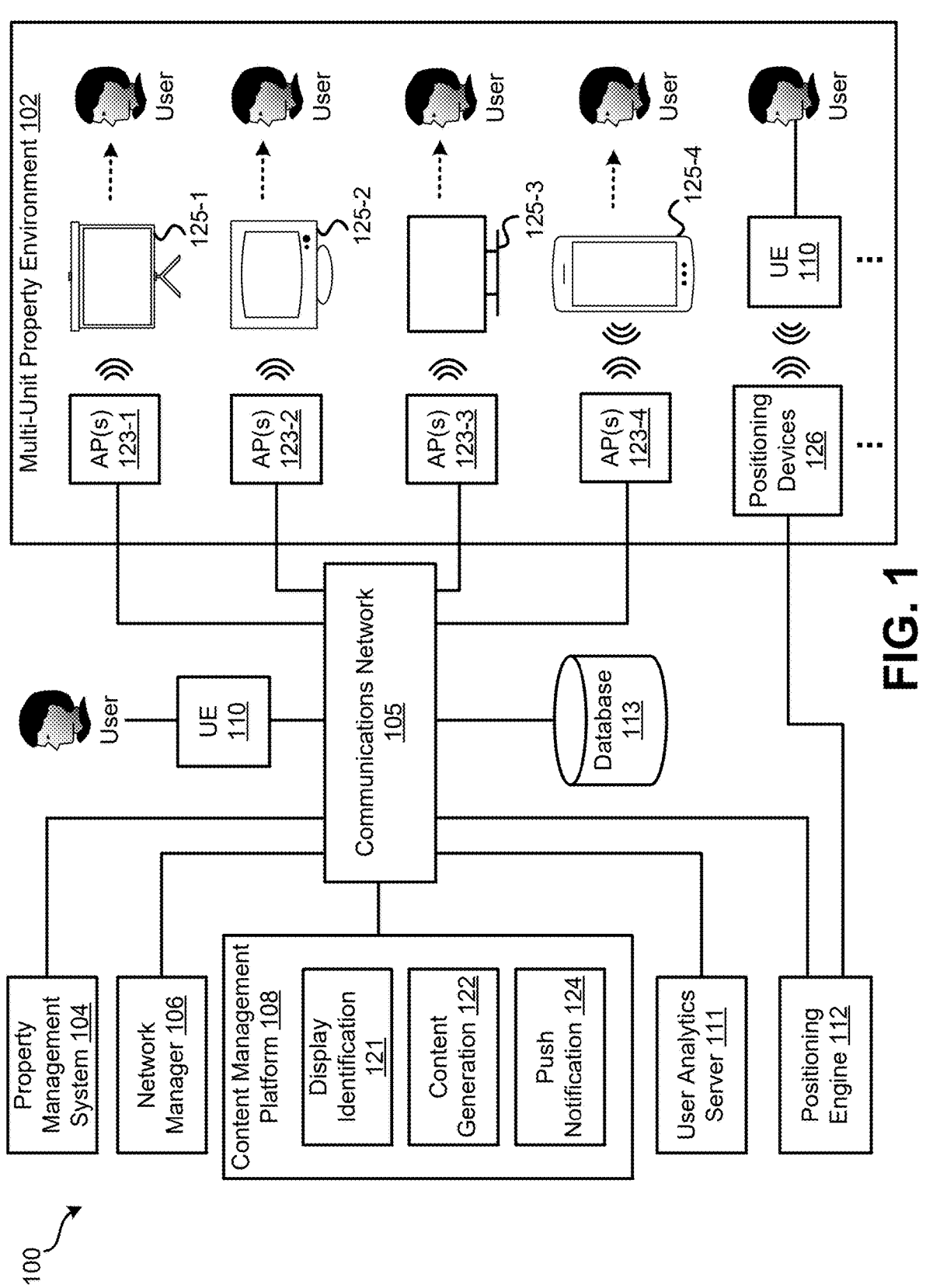
FIG. 1 is a block diagram illustrating an example of a communications system according to various embodiments.

FIG. 1 is a block diagram illustrating an example of a communications system 100 (also referred to as "system 100") according to various embodiments. In some embodiments, system 100 is a message/content delivery system for generating and delivering messages to a user (e.g., tenant, guest, resident, or occupant) of a multi-unit property. In the illustrated example, system 100 includes, among other components, a multi-unit property or multi-unit property environment 102, a property management system (PMS) 104, communications network(s) 105, a network manager 106, a content management platform (CMP) 108, a user equipment (UE) or user device 110 in connection with a user of the multi-unit property 102, a user analytics server 111, a positioning engine 112, multiple access points (APs) 123, and multiple display devices 125. Additional or fewer components may be included in the system 100. Various components in system 100 may be in communication with each other through the communications network 105. Each component of system 100 may be a hardware piece, a software piece, or a combination of both.

In the illustrated example, the "multi-unit property" or "multi-unit property environment" used herein refers to a complex and/or comprehensive property or premises that contains multiple individual living or occupation units, each intended for separate occupancy by residents or tenants. The multi-unit property is characterized by its multifamily or multi-occupant nature and encompasses a diverse range of housing and accommodation types, from residential to commercial, and may share common infrastructure and facilities while providing distinct units for habitation. The "multi-unit property" used herein encompasses a diverse spectrum of environments, ranging from single-family houses to lodging establishments like hospitality establishments, hotels, resorts, restaurants, bars, and motels, and to expansive complexes such as apartment buildings, senior living communities, short-term rental properties, student housing, commercial establishments such as office spaces, meeting facilities, retail establishments such as shopping centers, shops, grocery stores, supermarkets, petrol stations, service establishments such as medical centers, hospitals, clinics, colleges, manufacturing establishments such as factories, production and operation places. A multi-unit property may also encompass a multi-dwelling unit (MDU) that contains multiple units, rooms, divisions, or workspaces, each designed to cater to the specific needs and preferences of its tenants, residents, guests, occupants, visitors, patients, or workers.

The PMS 104 is a specialized platform of the multi-unit property 102 used to manage various information and facilitate, manage, and optimize provisioning of services to users of the multi-unit property 102. In some embodiment, the PMS 104 may further include a user registration module, a user on-boarding system, and a data collection module. The user registration module may be responsible for handling the registration of users within the multi-unit property environment 102. The user registration module may be used to obtain personal information of the user and establish a user profile, facilitate the establishment credentials for accessing various property services, and incorporate security measures such as user authentication and validation to ensure the accuracy and security of user profiles.

The user profile of a user may include various user profile data or information including but not limited to user identity, registration status, user experience level, a user characteristic, a point of interest (POI) of the user, specific purposes of residency, etc. For example, the registration status may indicate whether the user is registered as a staff member or a guest of a hotel; the user experience level may indicate whether the user is premium member or a standard member of the multi-unit property environment 102; the POI may indicate the user preference regarding various services; the specific purposes of residency may include a specific event such as a conference, a party, etc. the user intends to attend. The POI may be obtained from a source internal or external to the multi-unit property environment 102, for example, the user analytics server 111 and the database 113. The POI may include additional information such as user preference data including but not limited to communication preference, room or unit preference, dietary restriction, accessibility requirement, entertainment preference, temperature and lighting preference, event interests, and so on. Additional personal information may be included in the user profile.

The user on-boarding system of the PMS 104 may be responsible for facilitating the onboarding of users onto the multi-unit property 102, enabling users to register for access to various services by providing necessary information and agreeing to terms and conditions, managing access control policies and user privileges to ensure that the users have the appropriate level of access based on their authentication status and user profile data.

The data collection module of the PMS 104 may be responsible for collecting user behavior data on service usage, user interactions, user preferences within the multi-unit property 102, and update the user profiles with the collected data. For example, the data collection module may gather information on which services users are using, how often they are used, and the duration of use, information on how users interact with different services, such as touch-points, voice commands, app usage, or physical interactions various service provisioning devices of the multi-unit property, information on user preferences, such as preferred room settings (temperature, lighting, etc.), preferred media content, dietary restrictions for dining, and other personalized choices, information on the performance of the network, such as metrics on bandwidth utilization, latency, network outages, and user feedback on overall experiences. The PMS 104 may transmit the collected user data to the user analytics server 111 for further processing to extract new or additional user characteristics and user preferences (e.g., preferences on room settings, media content, streaming services, food, etc.), which can be used to update the user profile of the user.

The communications network 105 encompasses a broad spectrum of communication infrastructures that allows for transmission of information and messages among various components of the system 100. Communication network 105 may include wireless networks, which enable users to connect their devices (i.e., UE 110) wirelessly to Internet and local resources within the multi-unit property 102, cellular networks for mobile voice and data services, wide area network (WAN) for linking diverse property locations of the multi-unit property 102, local area network (LAN) for localized communication, Ethernet networks utilizing wired connections, high-speed fiber-optic networks, intranets and extranets to support internal and external communication, and hybrid networks that blend various technologies to facilitate specific property communication requirements. In some embodiments, the communications network 105 is a local network or an edge network connected to a central cloud network. In some embodiments, the communications network 105 is cloud based. The cloud-based network may be a private cloud network or a public cloud network.

The network manager 106 is responsible for managing the communication network infrastructure of the multi-unit property 102. The network manager 106 can configure and maintain network components, oversee IP address or IP address pools, protocols, and security settings for each component of the multi-unit property 102. The network manager 106 is also responsible for configuring and deploying various APs 123 within the multi-unit property 102, including determining the optimal locations for AP placement, specifying network settings, and integrating the APs 123 into the communications network infrastructure. The network manager 106 also continuously monitors the performance and status of APs 123, track the number of connected devices (i.e., UE 110, display devices 125), signal strength and characteristics, and network load, and resolve issues such as connectivity problems. The network manager 106 may also be used to set up security protocols and access controls on the APs 123, for example, using Wi-Fi encryption, AP authentication, and guest network configurations, such that only authorized users can connect to the APs 123. In scenarios where users move throughout the multi-unit property 102, the network manager 106 performs and controls device roaming for a user moving from one area to another, such that their device can smoothly transition from one AP 123 (e.g., AP 123-1) to another AP (e.g., AP 123-2) without losing connectivity.

In some embodiments, system 100 further includes one or more positioning devices 126 in connection with the positioning engine 112. The one or more positioning devices may be a part of a Real-Time Location System (RTLS) employing various radio frequency (RF) techniques, such as Bluetooth, Radio Frequency, Wide-Band Radio (WBR), Cellular (including various forms thereof), Sonar, and so on. An example of the positioning device is a broadcast device. The positioning devices 126 may be used to determine the real-time location of user within the multi-unit property. By leveraging a spectrum of RF techniques, the positioning devices 126 may facilitate dynamic location tracking to allow the positioning engine 112 to precisely and accurately identify and monitor the positions of UE 110 carried by the user.

In one example, the positioning device 126 is a RF broadcast device (e.g., a WBR node, a beacon, etc.) that further includes a component that actively transmits signals or messages and utilizes wavelength, oscillation, and/or amplitude to enable effective and responsive positioning within the broader RTLS framework of the system 100. The positioning device 126 can be strategically placed throughout the multi-unit property. The positioning device 126 may have a wider bandwidth than traditional RF systems to enable more accurate and high-resolution positioning. The positioning device 126 can periodically transmit signals, and these signals may be spread across a wide frequency range. UE 110, such as user devices, smartphones, or wearables by the user, are equipped with capabilities to communicate with the positioning device 126. UE 110 can continuously scan for signals from the positioning device 126. UE 110 can receive signals from multiple positioning device 126 and measure the time delay, signal strength, or other characteristics of the signals. employs algorithms to process the received signals and determine the user's location. The UE 110 can transmit the signal measurement data to the positioning engine 112 or another component of system 100, which can perform triangulation or trilateration, using the signal measurement data and analyzing the signals' characteristics, to determine the location and position of the UE 110 and the user. The positioning engine 112 can send the location information of the current location of the user to the content management platform (CMP) 108 through the communications network 105.

The content management platform (CMP) 108 is generally configured to identify one or more display devices 125, determine the type and characteristics (e.g., a privacy level) of the display device 125, determine the message (e.g., content and a message sensitivity level) to be displayed on the display device(s) 125, generate and deliver personalized content and messages to one or more display devices 125. In some embodiments, the CMP 108 further includes a display device identification module 121, a content/message generation module 122, and a push notification module 124. The display device identification module 121 is responsible for identifying one or more display devices 125 associated with and/or in proximity to a current location of an individual user or current locations of a group of users. The display device identification module 121 is also responsible for determining a privacy level of the display device 125. The content/message generation module 122 is responsible for creating tailored content and messages that align with the privacy level of the display device 125 as well as the preferences and characteristics of the target users. The push notification module 124 is responsible for delivering the messages to the designated users or groups in a real-time manner to facilitate communication and engagement.

The display device identification module 121 may receive the location information about the current location from the positioning engine 112 and identify one or more display devices 125 within the current location of the user. The display device identification module 121 may further determine privacy level of the display device 125. The privacy level of the display device 125 may be predetermined, based on the type, location, function, and other characteristics of the display device 125. The term "privacy level" used herein refers to a predetermined classification or categorization that signifies the intended degree of confidentiality or exposure associated with a display device 125. Privacy level serves as a qualitative indicator of the sensitivity and exclusivity of the content being displayed. Privacy levels may be determined and assigned based on predefined rules or policies. A higher privacy level implies a greater degree of confidentiality, restricting access to a more limited audience, while a lower privacy level suggests information intended for broader dissemination or public display. For example, a public information screen in a lobby might have a lower privacy level, as it is generally intended to display general announcements meant for public awareness. A display device 125 within a guest's private room may have a higher privacy level, as it is intended for personalized and private communication. The user's personal devices (e.g., UE 110) owned or operated by the user may have a high privacy. A display device 125 in a particular zone of the multi-unit property such as a shop, a restaurant, a conference room, etc. may have an intermediate privacy level, and the displayed information is intended for a semi-restricted audience. In some embodiments, the display devices 125 within the multi-unit property may be pre-classified into different classes, and each class has a class identifier (ID) and is designated with a pre-determined privacy level. The display device identification module 121 may determine the privacy level of the identified display device 125 based on the class ID associated with the display device 125.

The content/message generation module 122 may further include a software platform and/or tools that can be used to automatically create, edit, and organize various types of content, and manage text, images, videos, and other multimedia elements. The software platform may also allow for automatically generating message templates and defining content layouts. In some embodiments, the software platform may automatically generate multiple interrelated messages to be presented on different display devices 125 for a single user or a different users of a same user group. In some embodiments, the content/message generation module 122 may request access to, access, retrieve, or fetch relevant user information from a user profile provided by the user analytics server 111 or stored in database 113, and determine the content or message based on the retrieved user information.

In some embodiments, the content/message generation module 122 may access pertinent user information by retrieving it from the user registration profile and/or the user profile, which can be provided by PMS 104, user analytics server 111, and/or the database 113. This retrieved user information can be used for crafting content or messages that are specifically tailored to each individual user's registration status, characteristics, preferences, and behaviors. By analyzing and utilizing the data available in the user registration profile and user profile, the content/message generation module 122 may generate highly relevant and personalized contents and messages and contribute to a more engaging and user-centric experience within the multi-unit property 102.

The content/message generation module 122 may further determine a message type, a message sensitivity level, a target message duration, and a bundle of messages for an individual user. The message types may be classified and predetermined, for example, by the characteristics of the message, such as announcements, promotions, advertisements, event notifications, or general information. The content/message generation module 122 may select a message type for a message from an inventory of message types, based on the user's registration status, characteristics, and preferences.

The term "message sensitivity level" refers to the degree of sensitivity or specificity associated with the content of a particular message. The message sensitivity level indicates the extent to which the message contains personalized or confidential information versus generic and non-sensitive information. For example, messages with a high sensitivity level contain generic and non-sensitive information that is suitable for public display. These messages are less specific to the individual user and do not include personal or confidential data. For example, a message like "John, your room is ready" to be displayed on a public display of the multi-unit property 102 has a high sensitivity level because it is a general notification that does not divulge specific details. In contrast, messages with a low sensitivity level contain personalized and potentially sensitive information intended for private consumption on a user's personal device. These messages are specific to the user and may include personal or confidential data. For instance, a message like "John, your room 230 is ready, and the room temperature is set at 75° F." to be displayed on the user's personal mobile device has a low sensitivity level as it includes specific details relevant to the user's stay.

In some embodiments, content/message generation module 122 may determine the message sensitivity level to be displayed on a display device by a predetermined mapping rule that specifies the correlation between the message sensitivity level and the privacy level of the display device. The mapping rule acts as a set of guidelines that govern the assignment of message sensitivity levels based on the inherent privacy characteristics of the display device. The mapping rule may be predetermined based on factors such as the type of display device, its location, functionality, and other relevant attributes. By adhering to this predetermined mapping rule, the content generation module 122 allows the displayed messages to align with the expected privacy level of each display device.

The target message duration refers to the planned or optimal length of time for which a message, notification, or content is intended to be displayed or presented to the user of the multi-unit property 102. The target message duration signifies the duration during which the message should capture the user's attention, convey its content, and/or engage the user. The target message duration can vary depending on the message type, content, and context. For example, a short and snappy duration from 5 to 10 seconds may be suitable for brief notification or alerts. A standard duration from 15 to 30 seconds may be suitable for general announcements and promotional messages. An advertisement message on a public display within a hotel might have a target message duration of 20 seconds to provide enough time to convey the offer or information. Content-rich messages, such as event details or welcome messages, may require a longer duration. For example, a message welcoming a conference attendee might run for 60 seconds to provide essential details and instructions. Messages like in-room instructional videos or guided tours within a hotel or resort may have an extended target message duration to deliver comprehensive information to the user.

A bundle of messages refers to a collection of multiple messages that are designed to be displayed to an individual user either simultaneously on multiple displays or sequentially in a coordinated manner. The bundle of messages is grouped together with the intention of conveying a cohesive and comprehensive set of information, notifications, or content to enhance the user's experience. In some embodiments, a bundle of messages intended for a user can include distinct messages with varying sensitivity levels, where the timing and the level of privacy of each message are considered. For example, a first message, scheduled for display on a public device, possesses a higher sensitivity level. The first message could contain general or less specific information appropriate for a public display, such as a general announcement or notification intended for all guests or residents within the property. A second message, planned for presentation on the user's private device, has a lower message sensitivity level. The second message may contain more personalized or specific details tailored to the individual user, like room-specific information, reservation confirmations, or personal preferences. The first message is scheduled to appear on a public display device before the second message, which is timed for the user's private display device. This sequence may allow the more general or less specific information to reach the public first before the more personalized content intended for the individual user.

As another example, a bundle of messages for a group of users may include a group message and multiple individual and user-specific messages. The group message, scheduled for public display devices, carries a high sensitivity level and contains general information relevant to the entire group. This message serves as a common notification or announcement for all users within the group and is displayed on public screens. The multiple individualized messages are each tailored to a specific user within the group and have a lower sensitivity level and contain personalized or user-specific information. The multiple individualized messages are scheduled for display on each user's personal device. For example, in the context of a wedding party hosted at the multi-unit property 102 (e.g., a hotel), a bundle of messages is created by the content/message generation module 122. The group message, displayed on public display devices, serves as a general announcement, stating that the dinner for wedding party attendees is beginning. Simultaneously or sequentially, a series of personalized/individualized messages having a low message sensitivity level is sent to each guest's personal device. These personalized messages provide specific details for each guest, such as their reserved dinner seat at a particular table and their meal service preferences. For example, an individual message may be "John, Your Dinner Seat is Reserved at Table 12 with Vegetarian Service."

The push notification module 124 is responsible for scheduling the delivery of the messages generated by the content/message generation module 122 and deliver the messages to the intended display devices 125 for the user to view. The push notification module 124 may communicate with various APs 123 of the multi-unit property 102, which may transmit the messages to the intended display devices 125 connected to the APs 123. In some embodiments, the push notification module 124 may further includes one or more servers responsible for handling the computational load of scheduling and sending messages to multiple devices as well as network hardware equipment responsible for maintaining connectivity between the push notification module 124 and the APs 123 or other communication channels used to deliver messages. The push notification module 124 may be further responsible for receiving location information of a nearby public display device 125 identified in proximity to the user and delivering a message to the identified public display device 125. The identification is made possible by utilizing location information associated with the user and can be performed through the positioning engine 112. By leveraging the user's location data, the push notification module 124 can accurately determine the relevant public display devices 125 to transmit the message to and enhance the precision and effectiveness of message delivery within the multi-unit property 102.

The UE 110 encompass any personal user device connected to the APs 123 and owned, operated, and controlled by the user as well as any electronic devices associated with the user within the multi-unit property 102. Non-limiting examples of UE 110 include any types of user device, mobile devices, personal computers, smartphones, tablet computers, laptop computers, desktop computers, gaming devices, smart televisions, wearables, streaming sticks, smart projectors, virtual reality and augmented reality (VR/AR) devices, integrated receiver decoders, televisions (TV) and smart TVs, set top boxes, satellite set top box, gaming consoles, IoT devices such as smart thermostats, smart water heater, smart lighting devices, voice assistants, smart locks, water and energy monitoring devices, security cameras, smart smoke detectors, smart carbon monoxide detectors, and so on. The UE 110 may include, among other components, a processor, a memory storing various applications, an input/output (I/O) terminal, a Wi-Fi receiver or transceiver, a Bluetooth device, a RFID (Radio-Frequency Identification) scanning device, a network interface, a user interface, and a display device.

The user analytics server 111 is responsible for the analysis of historical user behavior data associated with the multi-unit property 102. The user analytics server 111 may extract user features, characteristics, and preferences from the historical user behavior data and continuously update the user profile. For example, the user analytics server 111 may update the POIs included in the user profile with respect to a specific multi-unit property. In some embodiments, the user analytics server 111 may be a third-party customer relationship management (CRM) system.

The positioning engine 112 is generally responsible for locating a user and/or providing location information of the user or a device of the user within the multi-unit property 102. Various techniques, including Wi-Fi positioning, AP triangulation, Bluetooth beacon, radio frequency identification (RFID), Wide-Band Radio (EBD), Sonar, cellular, sensor fusion, visual recognition, geofencing, etc., may be used to facilitate identification of the user's location.

In some embodiments, the positioning engine 112 may be configured to receive signal measurement data from APs 123 located in the multi-unit property 102. The signal measurement data is collected by the Wi-Fi receiver of the user device and is indicative of the user device's proximity to each AP 123. The positioning engine 112 may uses known location data about the locations of the APs 123 within the multi-unit property 102. The location data may be typically stored in a database or accessible from a network source of the multi-unit property 102. The positioning engine 112 may analyze the received signal measurement data to determine the strengths of signals from multiple APs. These signal strengths are associated with specific APs 123 within the multi-unit property 102. The positioning engine 112 may perform a triangulation calculation using the signal strengths and the known locations of the APs to estimate the user device's position within the multi-unit property 102, based on the intersecting signal coverage areas of the access points. The positioning engine 112 may determine the location of the user device within the multi-unit property 102 based on the calculated position. The location may be expressed in terms of coordinates (e.g., latitude and longitude, floor level, etc.) or a position relative to a reference location within the multi-unit property 102.

In some embodiments, the positioning engine 112 may be configured to identify the location of the user device using Bluetooth beacon (e.g., the broadcast device 210 of FIG. 2B). For example, the positioning engine 112 may emit Bluetooth signals from a set of strategically positioned Bluetooth beacons within the multi-unit property 102, where each Bluetooth beacon is uniquely identifiable and associated with a specific location or area of the multi-unit property 102. The user device equipped with Bluetooth capabilities may initiate to scan for and detect the emitted Bluetooth signals from the nearby Bluetooth beacons. The positioning engine 112 may collecting signal measurement data from the detected Bluetooth signals, representing the proximity of the user device to each respective beacon. Each beacon's unique identifier (i.e., beacon ID) may be associated with its precise physical location within the multi-unit property 102, and the beacon ID-to-location mappings may be stored in a Bluetooth beacon location mapping database. The positioning engine 112 may employ a triangulation algorithm to process the detected signal measurement data and known beacon locations to calculate the user device's approximate position within the multi-unit property. The positioning engine 112 may determine the location of the user device based on the triangulation calculation, and express the location (e.g., in terms of coordinates or relative position) within the multi-unit property 102.

In some embodiments, the positioning engine 112 may be configured to identify the location of the user device using RFID. For example, RFID tags (e.g., the broadcast device 210 of FIG. 2B) are placed at strategic locations within the multi-unit property 102, where each RFID tag is uniquely identifiable and corresponds to a specific location or area. The user device, equipped with RFID scanning capabilities, may be initiated to scan for and detect the RFID tags present in its proximity. The positioning engine 112 may detect the presence of RFID tags by the user device and recording the unique identifiers associated with each detected RFID tag. Each RFID tag's unique identifier may be associated with its precise physical location within the multi-unit property 102, and the RFID tag-to-location mappings may be stored in a RFID-to-location database. The positioning engine 112 may determine the user device's location within the multi-unit property 102, using the detected RFID tag identifiers and the RFID tag-to-location mappings, and expressing the user device's location (e.g., in terms of coordinates or a relative position within the multi-unit property 102).

In some embodiments, the positioning engine 112 may identify the location of a user device using visual recognition techniques. For example, visual recognition systems, which may include cameras or visual sensors, may be installed at strategic locations within the multi-unit property 102. The user device, equipped with visual recognition capabilities, may be activated or initiated to capture and analyze visual data from its surroundings. The user device captures visual data, which may include images or video streams of the immediate environment. The positioning engine 112 may use visual recognition algorithms and software to process the captured visual data and recognize specific markers, patterns, or visual cues within the multi-unit property 102. A database that maps recognized markers or patterns to their precise physical locations within the multi-unit property 102 may be preestablished. The positioning engine 112 may calculate the user device's location within the multi-unit property 102 using the visual data analysis and the information stored in the location-to-marker mapping database and express the user device's location in a suitable format.

It should be noted that above techniques used for identification of location of a user device within the multi-unit property 102 are for illustrative purposes only. Other techniques may also be possible in alternative embodiments and hence are included within the scope of this disclosure.

The APs 123 are generally network devices that extend the network coverage within the multi-unit property 102 and enable the devices such as UE 110 and display devices 125 to connect to the communications network 105 and communicate with other components in the system 100. In some embodiments, an AP 123 may be installed within one location (e.g., an area, a zone, a room, or a unit of multi-unit property 102 and exclusively used by the devices within that specific location. Alternatively, an AP 123 may be installed in a common area of the multi-unit property 102 and shared by multiple devices across various locations within the multi-unit property 102.

The display devices 125 are generally any electronic devices designed for the presentation of visual information, typically in a digital format to users of the multi-unit property 102. The display devices 125 may include public display devices, semi-public display devices, as well as private display devices. Public display devices are prominently placed in common areas accessible to a wide audience, such as lobbies, corridors, or shared spaces within the multi-unit property 102. Public display devices are intended to provide information and announcements relevant to all occupants, guests, or users. Examples of public display devices may include public information screens, hallway displays, lobby monitors, amenities area screens, digital directory boards, digital billboards, elevator displays, etc.

Semi-public display devices are typically located in areas with limited access or within specific zones and cater to a narrower audience, offering location-specific content or services. Examples of semi-public display devices may include screens in conference rooms, rooms reserved for specific activities or events, etc. For example, a Point-of-Sale screen on a restaurant table is a semi-public screen that are generally public in nature but can be private to individual users at that table for a specific/designated period of time. Private display devices are intended for individual use within the user's own unit, room, or personal space. Private display devices present personalized content and services, including in-room controls, customized messages, and entertainment options. As an example, a TV or large screen in a guest room of a hotel is private to the guests in that guest room. Private display devices may also encompass user's personal device such as mobile devices. Each displace device may have a specific privacy level. The privacy level may be predetermined based on the type, location, and function of the displace device, based on a preestablished rule.

In some embodiments, system 100 may further include a public display controller (not shown). Public display controller may be integrated into the CMP 108 or otherwise be an independent component interconnecting the CMP 108 and the public display devices (e.g., display devices 125-1). In some embodiments, the CMP 108 may generate an instruction containing the to-be-displayed messages (e.g., message type, content, target message duration, etc.) and scheduling information (e.g., the identified public display devices and time for displaying the messages) and send the instruction to the public display controller. The public display controller may follow the instruction and cause the public display devices to display the messages according to the instruction. Public display devices can display messages while currently showing other content through various techniques, such as message overlay, message scrolling, split-screen display, picture-in-picture display, and so on.

FIG. 2A is a schematic diagram illustrating an example of a messaging system 200A according to various embodiments. In the illustrated example, system 200A includes, among other components, a multi-unit property environment 102, a communications network 105, a CMP 108, a positioning engine 112, one or more APs 123, a private display device 125-4 (i.e., a user device such as the UE 110), and a display device 125-1. The user carrying the user device 125-4 is within the multi-unit property environment 102. The positioning engine 112 is configured to identify the location of the user device 125-4 and the AP 123-1 to which the user device 125-4 is connected. The positioning engine 112 is further configured to identify a zone 201 in which the user is located, based on the location of the user device 125-4 and the AP 123-1 to which the user device 125-4 is connected. The positioning engine 112 may further identify one or more display devices 125-1 (e.g., public display devices) in the zone 201 and in proximity to the user. The positioning engine 112 may transmit the location information of the user and identities of the display devices 125-1 and 125-4 to the CMP 108. The CMP 108 may generate one or more messages and transmit the messages to the display devices 125-1 and 125-4. The display devices 125-1 and 125-4 may promptly display the messages for the user to view. For example, the CMP 108 may generate and transmit a first message 202 to the display device 125-1 (e.g., a public display device) and generate and transmit a second message 204 to the display device 125-4 (e.g., a private user device of the user). The first and second messages 202 and 204 may be related and/or share common contents. The first and second messages 202 and 204 may have different message types, message sensitivity levels, target message durations, or other message characteristics. In some embodiments, the CMP 108 may generate and transmit a bundle of messages for multiple users of a common user group identified within the same zone 201, each message containing user-specific and personalized information for the corresponding user.

FIG. 2B is a schematic diagram illustrating an example of a messaging system 200B according to various embodiments. System 200B is a variation of system 200A and includes similar components thereof. In the illustrated example, system 200B includes among other components, multi-unit property environment 102, communications network 105, CMP 108, positioning engine 112, one or more APs 123, one or more display devices 125, UE 110, and broadcast devices 210. The user carrying the UE 110 is within the multi-unit property environment 102. The broadcast device 210 may be a part of a positioning system such as the Real-Time Location System (RTLS) described above. The broadcast device may operate to send RF signals. The UE 110 has the capability to scan for the RF signals, measure the RF signals, generate RF signal measurement data, and send the RF signal measurement data to the positioning engine 112. The positioning engine 112 is configured to identify the location of UE 110 based on the RF signal measurement data using triangulation or similar techniques. The positioning engine 112 is further configured to identify a zone 201 in which the user is located, based on the location of the UE 110. The positioning engine 112 may further identify one or more display devices 125 (e.g., public display devices) in the zone 201 and in proximity to the user. The positioning engine 112 may transmit the location information of the user and identities of the display devices 125 to the CMP 108. The CMP 108 may determine/identify a privacy level of the display device, determine a message sensitivity level of a message to be displayed on the display device, based on a predetermined mapping rule, generate one or more messages with the determined message privacy level, and transmit the messages to the display device 125. The display device 125 may promptly display the messages on the identified display device 125 for the user to view.

FIG. 3 is a schematic diagram illustrating an example of a messaging system 300 according to various embodiments. System 300 is a variation of systems 200A and 200B and includes similar components thereof. In the illustrated example, multiple users (e.g., user 1, user 2, etc.) are located in the multi-unit property 102. The multiple users may belong to the same user group or user class (i.e., their user profiles share a common user characteristic or a common POI). User 1 and user 2 may be located in different zones of the multi-unit property 102. Each user carries a user device (e.g., user device 303-1 for user 1, user device 303-2 for user 2). User device 303-1 may be connected to a first AP 123-1, and user device 303-2 may be connected to a second AP 123-2.

The positioning engine 112 is further configured to identify a first zone 301-1 in which user 1 is located, based on the location of the user device 303-1 and the first AP 123-1 to which the user device 303-1 is connected. The positioning engine 112 is further configured to identify a second zone 301-2 in which user 2 is located, based on the location of the user device 303-1 and the first AP 123-1 to which the user device 303-1 is connected. The positioning engine 112 may further identify one or more display devices 304-1 in the first zone 301-1 and in proximity to user 1 as well as one or more display devices 304-2 in the second zone 301-2 and in proximity to user 2. In some embodiments, the position engine 112 may determine the location of the user using positioning devices 126 shown in FIG. 2B.

The positioning engine 112 may transmit the location information of user 1 and user 2 as well as identities of the devices 303-1, 303-2, 304-1, and 304-2 to the CMP 108. The CMP 108 may determine the privacy level of each of the display devices 304-1 and 304-2, determine the message sensitivity level of messages 302 to be displayed on the display devices 304-1 and 304-2, and generate a bundle of messages including a group message 302 and various personal messages (e.g., a first personal message 306 for user 1 and a second personal message 308 for user 2). The group message 302 may have a message sensitivity level correlating or corresponding to the privacy level of the display devices 304-1 and 304-2. In some embodiments, the CMP 108 may identify multiple display devices 304-1 and/or multiple display devices 304-2 and determine a privacy level for each one of the multiple display devices 304-1 and 304-2. The CMP 108 may transmit the group message 302 respectively to the display devices 304-1 and 304-2. The display devices 304-1 and 304-2 may promptly display the group message for user 1 and user 2 to view. The CMP 108 may transmit the personal messages 306 and 308 respectively to user device 303-1 and user device 303-2. The group message 302 may have a first message sensitivity level, the personal messages 306 and 308 may have a second message sensitivity level, and the first message sensitivity lever is higher than the second message sensitivity level. System 300 allows users within the multi-unit property 102 to receive context-aware messages tailored to their locations, while also considering message sensitivity levels to prioritize information delivery.

FIG. 4A is an example message flow diagram illustrating interactions among components within a system of FIGS. 1-3 according to various embodiments. In the illustrated example of FIG. 4A, a UE or a user device 110 carried by a user of a multi-unit property 102 transmits (TRANSMISSION 402) signal measurement data to one or more APs 123 within the multi-unit property 102. The signal measurement data may include Wi-Fi signal strength data, Bluetooth signal strength data, RFID tag detection data, signal to noise ratio data, signal pattern data, etc. The AP 123 may transmit (TRANSMISSION 404) the signal measurement data to the positioning engine 112. The positioning engine 112 may identify (FUNCTION 406) a location of the user device 110, using various techniques such as Wi-Fi based AP triangulation, Bluetooth beacon, RFID tag, etc., as mentioned above. The positioning engine 112 may identify (FUNCTION 408) one or more display devices 125 in proximity to the user based on the user location information. The positioning engine 112 may further transmit (TRANSMISSION 410) the location information of the user device 110 and the identity of the identified display device 125 to the CMP 108. The CMP 108 may generate (FUNCTION 412) a message to be displayed for the user to view and transmit (TRANSMISSION 414) the message to the AP 123. The AP 123 may further transmit (TRANSMISSION 416) the message to the identified display device 125. The display device 125 may be activated to promptly display (FUNCTION 418) the message for the user to view. In some embodiments, the CMP 108 may generate (FUNCTION 412) additional message(s) to be displayed on the user device 110 and transmit (TRANSMISSION 422) the additional messages to the AP 123. The AP 123 may transmit (TRANSMISSION 424) the additional messages to the user device 110. The user device 110 may be activated to display the message or promptly notify (FUNCTION 426) the user of an incoming message.

FIG. 4B is another example message flow diagram illustrating interactions among components within a system of FIGS. 1-3 according to various embodiments. In the illustrated example of FIG. 4B, a positioning device 126 (e.g., a broadcast device) transmit (TRANSMISSION 452) RF signals to a UE or a user device 110 carried by a user of a multi-unit property 102. The UE 110, upon receiving the RF signals, generate signal measurement data and transmits (TRANSMISSION 402) the signal measurement data to the positioning engine 112 of the multi-unit property 102, for example, through one or more APs of a communication network. The signal measurement data may include RF strength and pattern, Bluetooth signal strength data, RFID tag detection data, signal to noise ratio data, signal pattern data, etc. The positioning engine 112 may identify (FUNCTION 456) a location of the UE 110, using various positioning techniques such as triangulation, Bluetooth beacon, RFID tag, etc., as mentioned above. The positioning engine 112 may identify (FUNCTION 458) one or more display devices 125 within the currently location of the user and in proximity to the user based on the user location information. The positioning engine 112 may further transmit (TRANSMISSION 460) the location information of the user device 110 and the identity of the identified display device 125 to the CMP 108. The CMP 108 may determine (FUNCTION 462) a privacy level of the display device and determine a message sensitivity level of a message to be displayed on the display device based on a predetermined mapping rule, generate (FUNCTION 464) a message to be displayed for the user to view based on the message sensitivity level, and transmit (TRANSMISSION 466) the message to identified display device 125. The display device 125 may be activated to promptly display (FUNCTION 468) the message for the user to view.

FIG. 5 is a flow diagram illustrating an example method according to various embodiments. The method 500 may be performed by one or more components of the system or device illustrated by FIGS. 1-3. Depending on the implementation, method 500 may include additional, fewer, or alternative steps/operations performed in various orders or in parallel. Method 500 or any steps/operations thereof may be combined with other methods (e.g., method 600) or operations thereof described herein in a suitable manner.

At 502, location of a user within a multi-unit property is identified, by a positioning engine. In some embodiments, signal measurement data including RF signal strength data is generated in a user device carried by the user within the multi-unit property. The signal measurement data is transmitted to and received by the positioning engine, and further processed by the positioning engine to determine the location of the user device, using a suitable positioning technique such as Wi-Fi triangulation, Bluetooth beacon, RFID, Wide-Band Radio, cellular (including various forms thereof), Sonar, etc., or a suitable RF technique, as mentioned above. In some embodiments, the signals are transmitted from an AP or a RF broadcast device and received by a signal receiver of the user device. The signal measurement data is generated by the user device and is indicative of the user device's proximity to each one of a plurality of signal sources (e.g., the broadcast devices) within the multi-unit property. Known location data about the locations of the signal source is retrieved from a location database. The signal strength data is converted to distances between the user device and the APs or broadcast devices within the multi-unit property. A triangulation calculation is performed by the positioning engine to determine the location of the user device relative to the APs or the broadcast devices.

Location information or location data of the user device may be generated and expressed in terms of coordinates or a relative location (e.g., relative to a reference location).

At 504, one or more display devices in proximity to the user within the multi-unit property are identified by the positioning engine or the CMP. In some embodiments, a zone within which the user device is located is identified, and one or more APs located in the zone are also identified, by the positioning engine. The identified display devices may be connected to the identified APs of the zone.

At 506 A privacy level of the identified display device is determined, based on a preestablished classification rule or a preestablished classification information stored in a database. The identified display device may be pre-classified to have a class ID indicating a specific privacy level. For example, the display device may be a public information screen that has a first privacy level indicating a relatively low privacy level, or alternatively, a semi-public display device intended to a limited group of users. In some embodiments, multiple display devices may be identified in proximity to the user, and the privacy level of each one of the display devices is determined. For example, the current location of the user may be a dining table in a restaurant (e.g., a zone) within the multi-unit property (e.g., a hotel). Two display devices may be identified in proximity to the user. A first display device is a public information device hanging on a wall, a second display device is a semi-public device strategically placed near the user's dining table for the guests of the dining table to view. The first display device is associated with a first privacy level, indicating a lower degree of confidentiality, while the second display device possesses a second privacy level that is higher than the first. The location information may be timestamped and transmitted to the CMP. It should be noted that the zone may be dynamic when the user is moving within the multi-unit property. The location of the user may be monitored continuously, and the APs located in the dynamic zone may be identified timely for the purposes of messaging the user.

At 508, a message sensitivity level of at least one message to be displayed on the identified display device is determined, based on the privacy level of the display device and a preestablished mapping rule that governs the correlation between the message sensitivity level and the privacy level. For example, the preestablished mapping rule may specify that a high privacy level of a display device (e.g., user's personal/private device, a TV or large display in a private room occupied by the user) corresponds to a low message sensitivity level. A medium privacy level of a display device (e.g., a semi-public display in a particular zone of the multi-unit property) corresponds to an intermediate message sensitivity level. A low privacy level of a display device (e.g., a public information display in a lobby of a hotel) corresponds to a high message sensitivity level. If multiple display devices are identified, the message sensitivity level for the message to be displayed on each display device may be determined.

At 510, one or more messages for the user are generated by the CMP, based on the message sensitivity level. In some embodiments, a message type, a target message duration, and contents of the message may be also determined by the CMP. In some embodiments, contents of the messages are determined based on the message sensitivity level, a user characteristic, such as a POI or a user intent, from a user registration profile and/or a user profile associated with the user. In some embodiments, the POI or user intent may be identified based on the location of the user. In some embodiments, multiple messages to be displayed respectively on multiple identified display devices may be generated by the CMP, and each message may have a specific message sensitivity level determined by a display type of the identified display device. For example, a message to be displayed on a public display device may have a high message sensitivity level; while a message to be displayed on a private display device may have a low message sensitivity level. In some embodiments, an instruction for displaying the messages containing a schedule for displaying the messages is also generated.

At 512, the generated messages along with the determined schedule are transmitted to the identified display device. In some embodiments, multiple messages are respectively transmitted to multiple identified display devices either simultaneously or in a sequential manner. The multiple messages may be intended for the same user but each has different message sensitivity levels and/or contains different contents for the user. In some embodiments, displaying of the messages on multiple devices may be synchronized.

At 514, the identified display device is caused to display the message at the determined schedule. For example, a first identified display device receiving a first message is caused to display the first message at a first time, and a second identified display device receiving a second message is caused to display the second message at a second time. The first time and the second time may be the same or different. The second time may be later than the first time, depending on the message sensitivity levels associated with the first and second messages.

FIG. 6 is a flow diagram illustrating another example method according to various embodiments. Method 600 is a variation of method 500 and may include additional, fewer, or alternative steps/operations performed in various orders or in parallel.

At 602, a plurality of users of a user group within a multi-unit property is identified by the PMS. The user group may be predetermined based on one or more common user characteristics or one or more common POIs determined by user registration profiles and/or user profiles associated with the users. At least a portion of the plurality of users may be located in different zones or areas within the multi-unit property.

At 604, a location for each one of the plurality of users within the multi-unit property is identified, by the positioning engine, in a similar manner as operation 502 of method 500. At 606, one or more display devices in proximity to each one of the plurality of users within the multi-unit property are identified by the positioning engine. In some embodiments, a zone within which the user device of each user is located is identified, and one or more APs located in the zone are also identified, by the positioning engine. The one or more display devices in proximity to each user may be connected to the identified APs of the identified zone in which each user is located. Location data representing a current location for each user may be generated, timestamped, and transmitted to the CMP. It should be noted that the zone may be dynamic when each user is moving within the multi-unit property. The location of the user may be monitored continuously, and the APs located in the dynamic zone may be identified timely for the purposes of messaging the user. In some embodiments, positioning devices may be used to identify the location of each user.

In some embodiments, the one or more display devices in proximity to each user may include a first display device having a first privacy level and a second display device having a second privacy level. The first privacy level and the second privacy level may be the same or different from each other. For example, the first display device may be a public information screen, and the first privacy level may be relatively low. The second display device may be the user device (i.e., user's personal device) having a high privacy level. In some embodiments, additional display devices may be identified, and the additional display device may have a privacy level similar to or different from the first privacy level and the second privacy level. The privacy level of each display device is identified/determined by the CMP.

At 608, a first privacy level of each one of the first display devices is determined. For example, the first display device is a public information screen in a public area of the multi-unit property, and the first privacy level indicates a relatively low degree of confidentiality of the message to be displayed on the first display device.

At 610, a first message sensitivity level of a group message to be displayed on the first display device is determined based on a predetermined mapping rule that specifies correlation between the first message sensitivity level and the first privacy level. The group message is related to a common user characteristic or a common POI of the plurality of users. The common POI may have a low specificity level. For example, the group message may as a general announcement for all users such that they are informed of the common POI.

At 612, the group message is generated and transmitted to each one of the first display devices. At 614, the identified first display devices are caused to display the group message for each one of the plurality of users in proximity to the identified first display device to view. In some embodiments, displaying of the group message on the multiple first display devices may be synchronized, such that the plurality of users may view the group message at substantially the same time.

In some embodiments, method 600 may further include operations/steps 622-630. At 622, a second display device in proximity to each one of the plurality of users within the multi-unit property is identified. In some embodiments, the first and second display devices may be identified concurrently. At 624, a second privacy level of each one of the second display devices is determined. For example, the second display device is an in-room private display in a private unit of the multi-unit property, a semi-public display device in a dedicated zone of the multi-unit property, or the user device carried by the user. The second privacy level indicates a high degree of confidentiality of the message to be displayed on the second display device. In some embodiments, the second privacy level is higher than the first privacy level.

At 626, a second message sensitivity level of a personal message to be displayed on the second display device is determined based on a predetermined mapping rule that specifies correlation between the second message sensitivity level and the second privacy level. The personal message is related to the group message and contains a user-specific POI. The user-specific POI has a high specificity level compared with the common POI and may be determined at least partially based on the current location of each user. The personal messages consider the unique needs of each user and may provide them with more precise and relevant information within the broader context of common POI.

At 628, the personal messages are respectively transmitted to the identified second display devices. At 630, the identified second display devices are caused to respectively display the personal messages for each one of the plurality users to view. In some embodiments, the user may be notified of the incoming personal message. In some embodiments, display of the personal messages on the second display devices and display of the group messages on the first display devices may be synchronized, such that they are displayed simultaneously. In some embodiments, the personal messages are displayed on the second display device after the group message is displayed on the first display device. In some embodiments, multiple group messages may be displayed on the first display devices in a sequence, and multiple personal messages may be displayed on the second display devices in a sequence.

The systems 100, 200A, 200B, and 300, and any components included therein as described above may include a computer system that further includes computer hardware and software that form special-purpose network circuitry to implement various embodiments such as communication, identification, triangulation, calculation, determination, and so on. FIG. 7 is a schematic diagram illustrating an example of computer system 700. The computer system 700 is a simplified computer system that can be used to implement various embodiments described and illustrated herein. A computer system 700 as illustrated in FIG. 7 may be incorporated into devices such as a portable electronic device, mobile phone, server grade machines, or other device as described herein. FIG. 7 provides a schematic illustration of one embodiment of a computer system 700 that can perform some or all of the steps of the methods and workflows provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown including hardware elements that can be electrically coupled via a bus 705, or may otherwise be in communication, as appropriate. The hardware elements may include one or more processors 710, including without limitation one or more general-purpose processors and/or one or more special-purpose processors such as digital signal processing chips, graphics acceleration processors, and/or the like; one or more input devices 715, which can include without limitation a mouse, a keyboard, a camera, and/or the like; and one or more output devices 720, which can include without limitation a display device, a printer, and/or the like.

The computer system 700 may further include and/or be in communication with one or more non-transitory storage devices 725, which can include, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset such as a Bluetooth™ device, a 602.11 device, a WiFi device, a WiMax device, cellular communication facilities, etc., and/or the like. The communications subsystem 730 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 730. In other embodiments, a portable electronic device, e.g., the first electronic device, may be incorporated into the computer system 700, e.g., an electronic device as an input device 715. In some embodiments, the computer system 700 will further include a working memory 735, which can include a RAM or ROM device, as described above.

The computer system 700 also can include software elements, shown as being currently located within the working memory 735, including an operating system 760, device drivers, executable libraries, and/or other code, such as one or more application programs 765, which may include computer programs provided by various embodiments, and/or may be designed to implement methods, and/or configure systems, provided by other embodiments, as described herein. Merely by way of example, one or more procedures described with respect to the methods discussed above, such as those described in relation to FIG. 7, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 725 described above. In some cases, the storage medium might be incorporated within a computer system, such as computer system 700. In other embodiments, the storage medium might be separate from a computer system e.g., a removable medium, such as a compact disc, and/or provided in an installation package, such that the storage medium can be used to program, configure, and/or adapt a general-purpose computer with the instructions/code stored thereon. These instructions might take the form of executable code, which is executable by the computer system 700 and/or might take the form of source and/or installable code, which, upon compilation and/or installation on the computer system 700 e.g., using any of a variety of generally available compilers, installation programs, compression/decompression utilities, etc., then takes the form of executable code.

It will be apparent that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 700 to perform methods in accordance with various embodiments of the technology. According to a set of embodiments, some or all of the operations of such methods are performed by the computer system 700 in response to processor 710 executing one or more sequences of one or more instructions, which might be incorporated into the operating system 760 and/or other code, such as an application program 765, contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 725. Volatile media include, without limitation, dynamic memory, such as the working memory 735.

Common forms of physical and/or tangible computer-readable media include, for example, a floppy disk, a flexible disk, hard disk, magnetic tape, solid state drive, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 and/or components thereof generally will receive signals, and the bus 705 then might carry the signals and/or the data, instructions, etc. carried by the signals to the working memory 735, from which the processor(s) 710 retrieves and executes the instructions. The instructions received by the working memory 735 may optionally be stored on a non-transitory storage device 725 either before or after execution by the processor(s) 710.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein and in the appended claims, the singular forms "a", "an", and "the" include plural references unless the context clearly dictates otherwise. Thus, for example, reference to "a device" includes a plurality of such devices, and reference to "the processor" includes reference to one or more processors and equivalents thereof known in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

What is claimed is:

1. A system for messaging a user of a multi-unit property, wherein the system comprises:
a positioning engine;
a property management system (PMS);
a content management platform (CMP); and
one or more display devices within the multi-unit property,
wherein the positioning engine is configured to:
identify a current location of a user located within the multi-unit property; and
identify at least one first display device in proximity to the user, based on the current location of the user within the multi-unit property,
wherein the PMS is configured to:
generate a user profile of the user;
identify a user characteristic of the user, based on the user profile; and
determine a point of interest (POI) for the user, based on the identified user characteristic and the location of the user,
wherein the CMP is configured to:

determine a first privacy level of the first display device;
generate at least one first message related to the determined POI, the at least one first message having a first message sensitivity level corresponding to the first privacy level;
transmit the at least one first message to the first display device; and
cause the first display device to display the first message for the user to view.

2. The system of claim 1, wherein the positioning engine is further configured to:
receive wireless signal measurement data from a user device associated with the user, the wireless signal measurement data including signal strength data of wireless signals transmitted between the user device and a plurality of signal sources with known locations within the multi-unit property; and
perform a triangulation calculation to determine the location of the user device, based on the signal strength data and the known locations of the plurality of signal sources.

3. The system of claim 1,
wherein the positioning engine is further configured to identify at least one second display device in proximity to the user, based on the current location of the user within the multi-unit property,
wherein the CMP is further configured to:
determine a second privacy level of the at least one second display device; and
generate at least one second message related to the first message, the at least one second message having a second message sensitivity level corresponding to the second privacy level.

4. The system of claim 3, wherein the CMP is further configured to:
transmit the at least one second message to the second display device; and
cause the second display device to display the second message for the user to view.

5. The system of claim 4, wherein the CMP is further configured to synchronize the display of the first message on the first display device and the display of the second message on the second display device.

6. The system of claim 4, wherein the first message is displayed on the first display device at a first time, and the second message is displayed on the second display device at a second time later than the first time.

7. The system of claim 3, wherein the second message sensitivity level is lower than the first message sensitivity level.

8. The system of claim 3, wherein the second display device is a user device carried by the user, and the CMP is further configured to:
transmit the at least one second message to the user device; and
notify the user of the second message.

9. The system of claim 3, wherein the CMP is further configured to:
determine a first target duration for the first message, wherein the first message is displayed on the first display device for the determined first target duration.

10. The system of claim 9, wherein the CMP is further configured to:
determine a second target duration for the second message, wherein the second message is displayed on the first display device for the determined second target duration, and the second target duration is longer than the first target duration.

11. A computer-implemented method, comprising:

identifying a current location of a user located within a multi-unit property;

identifying a user characteristic of the user, based on a user profile associated with the user;

determining a point of interest (POI) for the user, based on the identified user characteristic and the current location of the user;

identifying at least one first display device in proximity to the user, based on the current location of the user within the multi-unit property;

determining a first privacy level of the first display device;

generating at least one first message related to the determined POI, the at least one first message having a first message sensitivity level corresponding to the first privacy level;

transmitting the at least one first message to the first display device; and causing the first display device to display the first message for the user to view.

12. The method of claim 11, wherein identifying the current location of the user further comprises:

receiving wireless signal measurement data from a user device associated with the user, the wireless signal measurement data including signal strength data of wireless signals transmitted between the user device and a plurality of signal sources with known locations within the multi-unit property; and performing a triangulation calculation to determine the location of the user device, based on the signal strength data and the known locations of the plurality of signal sources.

13. The method of claim 11, further comprising:

identifying at least one second display device in proximity to the user, based on the current location of the user within the multi-unit property;

determining a second privacy level of the at least one second display device; and generating at least one second message related to the first message, the at least one second message having a second message sensitivity level corresponding to the second privacy level.

14. The method of claim 13, further comprising:

transmitting the at least one second message to the second display device; and causing the second display device to display the second message for the user to view.

15. The method of claim 14, further comprising:

synchronizing the display of the first message on the first display device and the display of the second message on the second display device.

16. The method of claim 14, wherein the first message is displayed on the first display device at a first time, the second message is displayed on the second display device at a second time later than the first time.

17. The method of claim 13, wherein the second message sensitivity level is lower than the first message sensitivity level.

18. The method of claim 13, wherein the second display device is a user device carried by the user, and the method further comprises:

transmitting the at least one second message to the user device; and notifying the user of the second message.

19. The method of claim 13, further comprising:

determining a first target duration for the first message, wherein the first message is displayed on the first display device for the determined first target duration.

20. The method of claim 19, further comprising:

determining a second target duration for the second message, wherein the second message is displayed on the first display device for the determined second target duration, and the second target duration is longer than the first target duration.

* * * * *